United States Patent [19]
Minowa et al.

[11] Patent Number: 5,481,172
[45] Date of Patent: Jan. 2, 1996

[54] CIRCUIT FOR CONTROLLING POWER CONVERTING APPARATUS

[75] Inventors: Hirofumi Minowa; Shinichi Ishii; Takao Yanase; Masaru Yamazoe, all of Kawasaki, Japan

[73] Assignee: Fuji Electric Co., Ltd., Kanagawa, Japan

[21] Appl. No.: 51,944

[22] Filed: Apr. 26, 1993

[30] Foreign Application Priority Data

Apr. 27, 1992 [JP] Japan .................................. 4-154063

[51] Int. Cl.⁶ .............................. H02M 7/00; H02P 5/40
[52] U.S. Cl. ......................... 318/800; 318/807; 318/803
[58] Field of Search ...................................... 318/800–832, 318/799; 388/821, 820; 323/217

[56] References Cited

U.S. PATENT DOCUMENTS

| | | | |
|---|---|---|---|
| 3,935,518 | 1/1976 | Yatsuk et al. | |
| 4,626,761 | 12/1986 | Blaschke | 318/803 |
| 4,629,961 | 12/1986 | Blaschke | 318/803 |
| 4,673,858 | 6/1987 | Saito | 318/805 |
| 4,763,058 | 8/1988 | Heining et al. | 318/807 |
| 4,792,741 | 12/1988 | Matsuo et al. | 318/800 |
| 4,885,520 | 12/1989 | Sugimoto et al. | 318/808 |
| 5,144,564 | 9/1992 | Naidu et al. | 318/721 X |
| 5,272,428 | 12/1993 | Spiegel et al. | 318/803 |
| 5,294,876 | 3/1994 | Jonsson | 318/803 |
| 5,298,847 | 3/1994 | Kerkman et al. | 318/800 |

FOREIGN PATENT DOCUMENTS

| | | |
|---|---|---|
| 2329582 | 1/1974 | Germany. |
| 2919852 | 12/1980 | Germany. |
| 3203974 | 8/1983 | Germany. |
| 3323100 | 1/1985 | Germany. |
| 3715462 | 11/1987 | Germany. |

OTHER PUBLICATIONS

"Application Guide to Inverter Drive", Technical Reference No. 148 of the Japan Electrical Manufacturers' Association (Ref. 1).

"Current Oscillation Limiting of an Inverter—Induction Motor System", National Meeting of Institute of Electric Engineers of Japan, No. 1665, 1989 (Ref. 2).

"High–Performance General Purpose Inverter Based On Flux Control PWM Method", IEA–87–6, Society for the Study of Industrial Electric Power Application of the Institute of Electric Engineers of Japan.

*Primary Examiner*—Paul Ip
*Attorney, Agent, or Firm*—Spencer, Frank & Schneider

[57] ABSTRACT

A control circuit for controlling a power converting apparatus, maintaining a stable operation of an induction motor. The control circuit includes an exciting current obtaining circuit which obtains the exciting current component from a detected signal of primary currents of the induction motor, a circuit which obtains an exciting current oscillation component from the exciting current correlate, a circuit which obtains correcting quantity from the exciting current oscillation component, and circuits which correct the voltage command or the flux command by the correcting quantity, and provide it to the power converting apparatus as stator axis voltage command values.

11 Claims, 13 Drawing Sheets

CIRCUIT FOR CONTROLLING POWER CONVERTING APPARATUS

BACKGROUND OF THE INVENTION

1. Field of the Invention

The present invention relates to a circuit for controlling a power converting apparatus such as a V/f controlled PWM inverter for driving an induction motor.

2. Description of the Prior Art

It is known in the art that induction motors driven by V/f controlled PWM inverters may suffer from abnormal oscillation caused by oscillation of motor currents (see, "Application Guide to Inverter Drive", Technical Reference No. 148 of the Japan Electrical Manufacturers' Association).

One method for limiting the oscillation of such a motor current is disclosed in an article "Limiting Current Oscillation in an Inverter-Induction Motor System", Published in the National Meeting of Institute of Electric Engineers of Japan, No. 1665, 1989. This method detects the primary currents of an induction motor, computes the amplitude of the current, picks up an oscillation component from the amplitude of the current, and corrects an output voltage command value by using the oscillation component.

As a control method of V/f controlled PWM inverters, a flux control method is known in the art (see, "High-Performance, General Use Flux Controlled PWM Inverter" IEA-87-6, Society for the Study of Industrial Electric Power Application of the Institute of Electric Engineers of Japan). This method detects terminal voltages of an induction motor via an integrator, assumes that the detected signals correspond to the primary flux of the induction motor and controls it to agree with flux command values by an adjuster, so that the primary flux is controlled to maintain a constant value.

The above-mentioned methods, however, cannot fully limit the oscillation of the motor current when the condition of load, the type and capacity of a motor and the like change.

SUMMARY OF THE INVENTION

It is therefore an object of the present invention to provide a circuit for controlling a power converting apparatus which can positively limit the oscillation of motor currents.

To accomplish the object, the present invention performs the following control:

(1) It detects the oscillation component of the exciting current of an induction motor by computing an exciting current correlate (component) from a detected signal of a motor current, and controls the voltage command value such that the oscillation component is limited.

(2) In a flux control method, a flux command value is controlled such that the oscillation component of the exciting current is limited.

According to the present invention, there is provided a control circuit for controlling a power converting apparatus in response to one or more command values, the control circuit comprising:

exciting current obtaining means for obtaining an exciting current correlate from a detected signal of each phase of primary currents of an induction motor;

oscillation component obtaining means for obtaining an oscillation component of the exciting current from the exciting current correlate;

correcting quantity obtaining means for obtaining a correcting quantity from the oscillation component of the exciting current; and command providing means for correcting at least one of the command values using the correcting quantity, and for providing the power converting apparatus with stator axis voltage command values obtained on the basis of the corrected command values.

The exciting current obtaining means may comprise vector rotation means for resolving the primary currents of the induction motor into a d-axis component and a q-axis component on an orthogonal d-q axis coordinate system by using a reference angle that rotates at an angular velocity identical with that of an output of the power converting apparatus, and outputs the d-axis component of the primary currents of the induction motor as the exciting current correlate;

the correcting quantity obtaining means may obtain from the oscillation component of the exciting current an exciting voltage oscillation component $\Delta v$, and may output the exciting voltage oscillation component $\Delta v$ as the correcting quantity; and the command providing means may comprise correcting means for correcting the command values, which are provided in the form of a q-axis voltage command value and a d-axis voltage command value on the orthogonal d-q axis coordinate system, in a manner that the q-axis voltage command is corrected by the exciting voltage oscillation component $\Delta v$ while the d-axis voltage command value is set to zero, and coordinate transformation mean for transforming the corrected q-axis voltage command value and the d-axis voltage command value into the stator axis voltage command values.

A control circuit for controlling a power converting apparatus may further comprise flux detecting means for detecting flux of each phase of the induction motor, wherein the exciting current obtaining means may comprise vector rotation means for resolving the primary currents of the induction motor into a d-axis component and a q-axis component on an orthogonal d-q axis coordinate system by using a reference angle that rotates at an angular velocity identical with that of an output of the power converting apparatus, and outputs the d-axis component of the primary currents of the induction motor as the exciting current correlate;

the correcting quantity obtaining means may obtain from the oscillation component of the exciting current a flux oscillation component $\Delta\phi$, and may output the flux oscillation component $\Delta\phi$ as the correcting quantity; and the command providing means may comprise correcting means for correcting the command values, which are provided in the form of a d-axis flux command value and a q-axis flux command value on the orthogonal d-q axis coordinate system, in a manner that the d-axis voltage command is corrected by the flux oscillation component $\Delta\phi$ while the q-axis flux command value is set to zero, coordinate transformation mean for transforming the corrected d-axis flux command value and the q-axis flux command value into stator axis flux command values, and adjusting means for changing a difference between each of the stator axis flux command values and each flux detected by the flux detecting means into the stator axis voltage command values.

A control circuit for controlling a power converting apparatus may further comprise flux detecting means for detecting flux of each phase of the induction motor, wherein the exciting current obtaining means may comprise vector rotation means for resolving the primary currents of the induction motor into a d-axis component and a q-axis component on an orthogonal d-q axis coordinate system by using a reference angle that rotates at an angular velocity identical with that of an output of the power converting apparatus, and outputs the d-axis component of the primary currents of the induction motor as the exciting current correlate;

the correcting quantity obtaining means may obtain from the oscillation component of the exciting current a flux oscillation component $\Delta\phi$, and may output the flux oscillation component $\Delta\phi$ as the correcting quantity; and the command providing means may comprise correcting means for correcting the command values, which are provided in the form of a d-axis flux command value and a q-axis flux command value on the orthogonal d-q axis coordinate system, in a manner that the d-axis voltage command is corrected by the flux oscillation component $\Delta\phi$, means for obtaining a difference between the corrected d-axis flux command value and a d-axis flux detected by the detecting means, and a difference between the q-axis flux command value and a q-axis flux detected by the detecting means, adjusting means for changing each of the differences into d-axis and q-axis voltage command values, and coordinate transformation means for transforming the d-axis and q-axis voltage command values into the stator axis voltage command values.

A control circuit for controlling a power converting apparatus may further comprise flux detecting means for detecting flux of each phase of the induction motor, wherein the exciting current obtaining means may comprise vector rotation means for resolving the primary currents of the induction motor into a d-axis component and a q-axis component on an orthogonal d-q axis coordinate system by using a reference angle that rotates at an angular velocity identical with that of an output of the power converting apparatus, and outputs the d-axis component of the primary currents of the induction motor as the exciting current correlate;

the correcting quantity obtaining means may obtain from the oscillation component of the exciting current an exciting voltage oscillation component $\Delta v$, and may output the exciting voltage oscillation component $\Delta v$ as the correcting quantity; and the command providing means may comprise means for obtaining a difference between the d-axis flux command value and a d-axis flux detected by the detecting means, and a difference between the q-axis flux command value and a q-axis flux detected by the detecting means, adjusting means for changing each of the differences into a d-axis voltage command value and a q-axis voltage command value, correcting means for correcting the q-axis voltage command value by the voltage correcting quantity $\Delta v$, and coordinate transformation means for transforming the d-axis voltage command value and said corrected q-axis voltage command value into the stator axis voltage command values.

The exciting current obtaining means may comprise vector rotation means for resolving the primary currents of the induction motor into a d-axis component and a q-axis component on an orthogonal d-q axis coordinate system by using a reference angle that rotates at an angular velocity identical with that of an output of the power converting apparatus, and outputs the d-axis component of the primary currents of the induction motor as the exciting current correlate;

the correcting quantity obtaining means may obtain from the oscillation component of the exciting currents an exciting voltage oscillation component $\Delta v$, and may output the exciting voltage oscillation component $\Delta v$ as the correcting quantity; and the command providing means may comprise voltage amplitude obtaining means for obtaining a voltage amplitude from a frequency command value, three-phase oscillating means for generating stator axis voltage command values from the voltage amplitude and the frequency command value, and correcting means for correcting the stator axis voltage command values by the voltage correcting quantity $\Delta v$.

A control circuit for controlling a power converting apparatus may further comprise flux detecting means for detecting flux of each phase of the induction motor, wherein the exciting current obtaining means may comprise vector rotation means for resolving the primary currents of the induction motor into a d-axis component and a q-axis component on an orthogonal d-q axis coordinate system by using a reference angle that rotates at an angular velocity identical with that of an output of the power converting apparatus, and outputs the d-axis component of the primary currents of the induction motor as the exciting current correlate;

the correcting quantity obtaining means may obtain from the oscillation component of the exciting current a flux oscillation component $\Delta\phi$, and may output the flux oscillation component $\Delta\phi$ as the correcting quantity; and the command providing means may comprise flux amplitude obtaining means for obtaining a flux amplitude from a frequency command value, three-phase phase oscillating means for generating stator axis flux command values from the flux amplitude and the frequency command value, correcting means for correcting the stator axis flux command values by the flux correcting quantity $\Delta\phi$, means for computing a difference between each of the stator axis flux command values and each detected flux by the flux detecting means, and adjusting means for changing the difference to each one of the stator axis voltage command values.

The exciting current obtaining means may comprise means for detecting an absolute value of the primary currents of the induction motor from the primary currents, means for detecting a phase angle of the primary currents with regard to a stator orthogonal coordinate system from the primary currents of the induction motor, means for detecting a phase angle of terminal voltages of the induction motor with regard to the stator orthogonal coordinate system from the terminal voltages, and means for computing the exciting current correlate on the basis of the absolute value of the primary currents, the phase angle of the primary currents and the phase angle of the terminal voltages;

the correcting quantity obtaining means may obtain from the oscillation component of the exciting current an exciting voltage oscillation component $\Delta v$, and may output the exciting voltage oscillation component $\Delta v$ as the correcting quantity; and the command providing means may comprise voltage amplitude obtaining means for obtaining a voltage amplitude from a frequency command value, three-phase oscillating means for generating stator axis voltage command values from the voltage amplitude and the frequency command value, and correcting means for correcting the stator axis voltage command values by the voltage correcting quantity Δv.

The exciting current obtaining means may comprise means for detecting an absolute value of the primary currents of the induction motor from the primary currents, means for detecting a phase angle of the primary currents with regard to a stator orthogonal coordinate system from the primary currents of the induction motor, means for detecting a phase angle of the stator voltage command values with regard to the stator orthogonal coordinate system from the stator voltage command values, and means for computing the exciting current correlate on the basis of the absolute value of the primary currents, the phase angle of the primary currents and the phase angle of the voltage command values;

the correcting quantity obtaining means may obtain from the oscillation component of the exciting current an exciting voltage oscillation component Δv, and may output the exciting voltage oscillation component Δv as the correcting quantity; and the command providing means may comprise voltage amplitude obtaining means for obtaining a voltage amplitude from a frequency command value, three-phase oscillating means for generating stator axis voltage command values from the voltage amplitude and the frequency command value, and correcting means for correcting the stator axis voltage command values by the voltage correcting quantity Δv.

A control circuit for controlling a power converting apparatus may further comprise flux detecting means for detecting flux of each phase of the induction motor, wherein the exciting current obtaining means may comprise means for detecting an absolute value of the primary currents of the induction motor from the primary currents, means for detecting a phase angle of the primary currents with regard to a stator orthogonal coordinate system from the primary currents of the induction motor, means for detecting a phase angle of terminal voltages of the induction motor with regard to the stator orthogonal coordinate system from the terminal voltages, and means for computing the exciting current correlate on the basis of the absolute value of the primary currents, the phase angle of the primary currents and the phase angle of the terminal voltages;

the correcting quantity obtaining means may obtain from the oscillation component of the exciting current a flux oscillation component Δφ, and may output the flux oscillation component Δφ as the correcting quantity; and the command providing means may comprise flux amplitude obtaining means for obtaining a flux amplitude from a frequency command value, three-phase oscillating means for generating stator axis flux command values from the flux amplitude and the frequency command value, correcting means for correcting the stator axis flux command values by the flux correcting quantity Δφ, means for computing a difference between each of the stator axis flux command values and each detected flux by the flux detecting means, and adjusting means for changing the difference to each one of the stator axis voltage command value.

A control circuit for controlling a power converting apparatus may further comprise flux detecting means for detecting flux of each phase of the induction motor, wherein the correcting quantity obtaining means may obtain from the oscillation component of the exciting current a flux oscillation component Δφ, and may output the flux oscillation component Δφ as the correcting quantity;

the command providing means may comprise flux amplitude obtaining means for obtaining a flux amplitude from a frequency command value, three-phase oscillating means for generating stator axis flux command values from the flux amplitude and the frequency command value, correcting means for correcting the stator axis flux command values by the flux correcting quantity Δφ, means for computing a difference between each of the stator axis flux command values and each detected flux by the flux detecting means, and adjusting means for changing the difference to each one of the stator axis voltage command value, and the exciting current obtaining means may comprise means for detecting an absolute value of the primary currents of the induction motor from the primary currents, means for detecting a phase angle of the primary currents of the induction motor with regard to a stator orthogonal coordinate system from the primary currents, means for detecting a phase angle of the stator axis voltage values outputted from the adjusting means with regard to the stator orthogonal coordinate system from the stator axis voltage values, and means for computing the exciting current correlate on the basis of the absolute value of the primary currents, the phase angle of the primary currents and the phase angle of the voltage command values.

The correcting means may comprise function generating means for generating three-phase signals in phase with the stator axis voltage command values, and may correct each of the stator voltage axis voltage command values by a product obtained by multiplying the exciting voltage oscillation component Δv by each of the three-phase signals.

According to the present invention, a stable operation can be maintained even when load is applied because the voltage command value is controlled so that only the oscillation component of the exciting current correlate is limited which is obtained from the primary currents of the induction motor.

In the flux control, since the flux command values are controlled so as to limit the oscillation, a stable operation is achieved even when the type or capacity of the motor changes.

The above and other objects, effects, features and advantages of the present invention will become more apparent from the following description of the embodiments thereof taken in conjunction with the accompanying drawings.

DETAILED DESCRIPTION OF PREFERRED EMBODIMENTS

The invention will now be described with reference to the accompanying drawings.

EMBODIMENT 1

Figure 1:
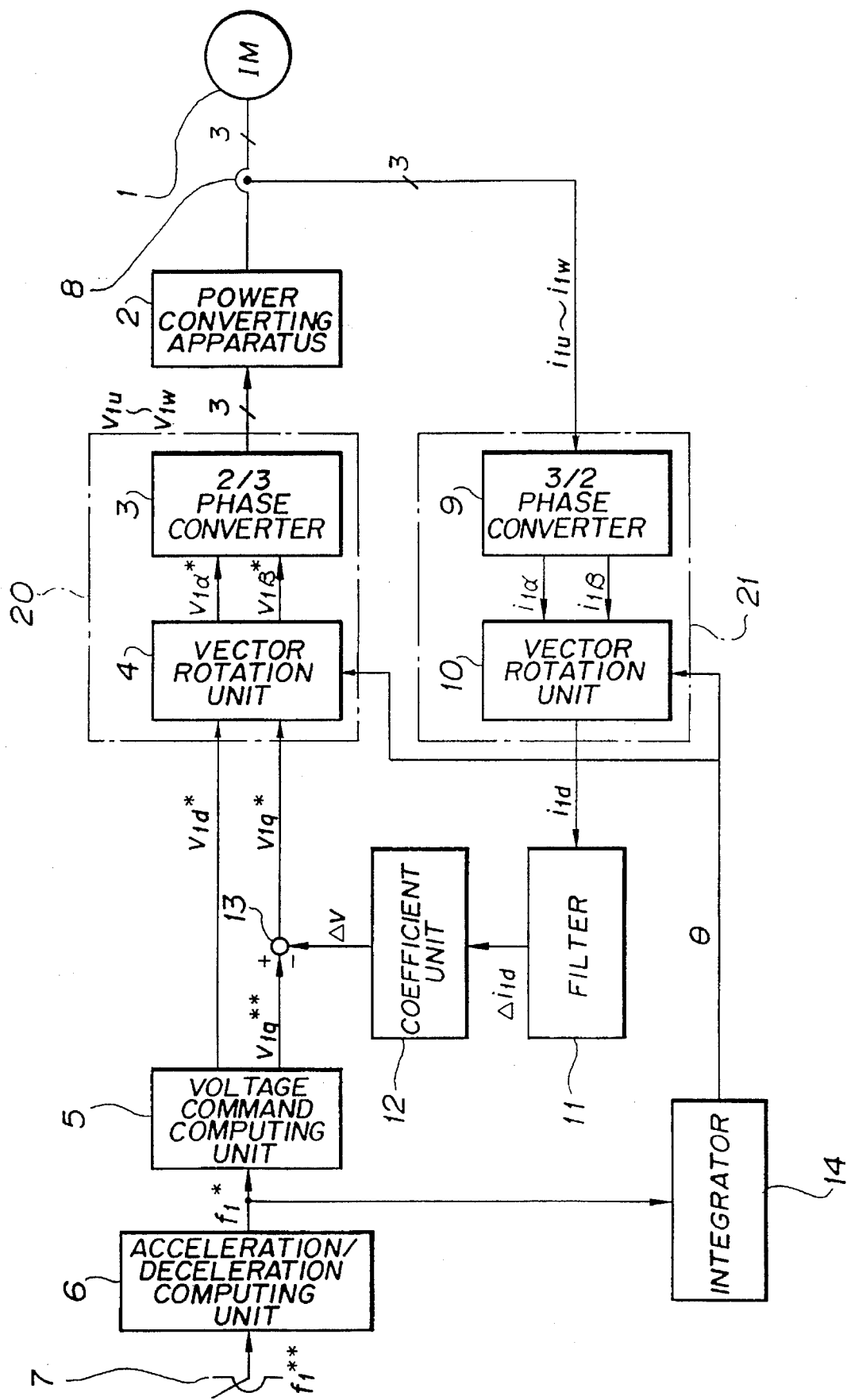
FIG. 1 is a block diagram showing a first embodiment in accordance with the present invention.

FIG. 1 is a block diagram showing a first embodiment of the present invention. In this figure, the reference numeral 1 designates a three-phase induction motor, the reference numeral 2 denotes a power converting apparatus such as a PWM inverter for driving the induction motor 1.

In a control circuit, a frequency setting value $f_1^{**}$ provided by a frequency setting unit 7 is fed to an acceleration and deceleration computing unit 6. This unit 6 computes the output frequency command value $f_1^*$ of the power converting apparatus 2 in accordance with a predetermined acceleration and deceleration time period, and supplies it to a voltage command computing unit 5 and an integrator 14.

The voltage command computing unit 5 computes a d-axis (direct axis) voltage command value $v_{1d}^*$ and a q-axis (quadrature axis) voltage command value $v_{1q}^{**}$ of an orthogonal d-q axis coordinate system that rotates at the output frequency of the power converting apparatus 2, so that the V/f ratio is maintained constant. The integrator 14 computes a reference phase angle $\theta$ from the output frequency command value $f_1^*$.

The primary currents of the induction motor are detected for each phase by a current detector 8, and are inputted to an exciting current computing unit 21. The exciting current computing unit 21 comprises a three phase to two phase converter 9, a vector rotation unit 10 whose reference phase angle is $\theta$. The d-axis current component $i_{1d}$ (that is, an exciting current correlate) or component outputted from the vector rotation unit 10 is fed to a filter 11. The filter 11 passes an oscillation component $\Delta i_{1d}$, which is converted to a voltage correcting quantity $\Delta v$ through a coefficient unit 12.

The voltage correcting quantity $\Delta v$ is inverted and fed to an adder 13. The adder 13 outputs the q-axis voltage command value $v_{1q}^*$ which is the difference between the q-axis voltage command value $v_{1q}^{**}$ and the voltage correcting quantity $\Delta v$. The coefficient of the coefficient unit 12 is not limited to a fixed value, but may be changed in accordance with the output frequency or load so that the effect of the oscillation limit can be further improved.

The voltage command values $v_{1d}^*$ and $v_{1q}^*$ of the rotating orthogonal d and q axis coordinate system are transformed into the voltage command values $v_{1u}^*$–$v_{1w}^*$ on the stator axis by a coordinate transformation unit 20. The coordinate transformation unit 20 comprises a vector rotation unit 4 and a two phase to three phase converter 3. The power converting apparatus 2 is controlled by the voltage command values $v_{1u}$–$v_{1w}$, and controls the induction motor 1 connected to the output side thereof.

Figure 2:
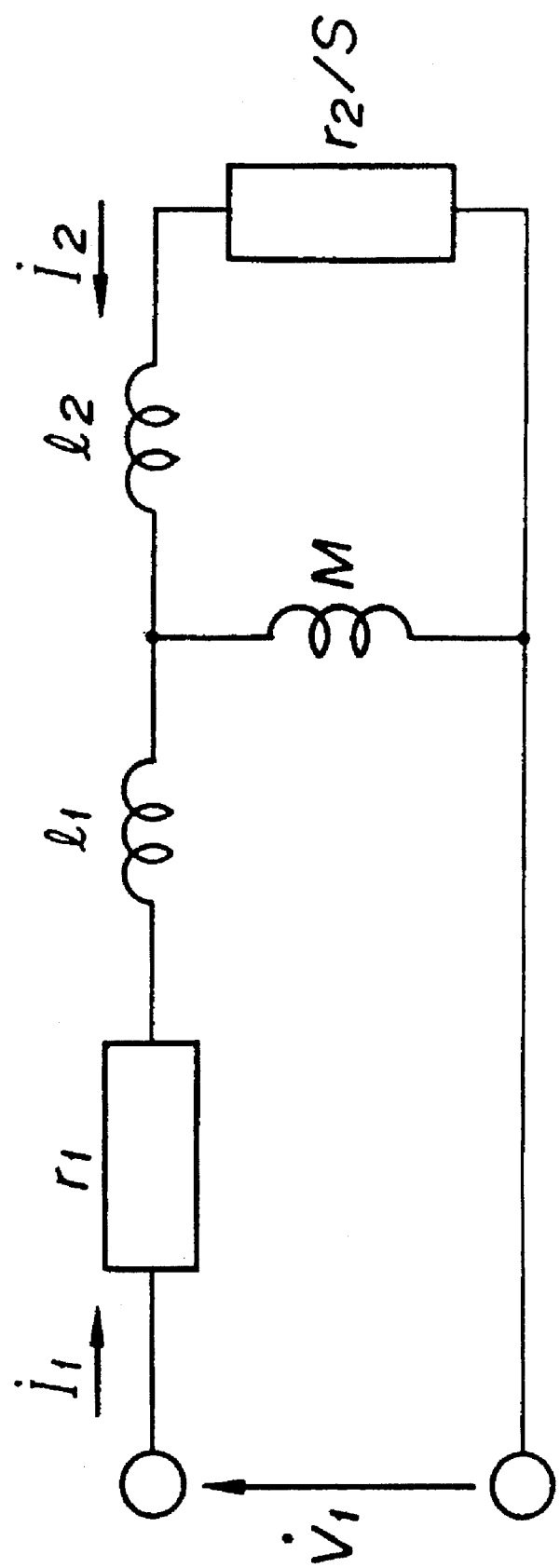
FIG. 2 is a diagram showing an equivalent circuit of an induction motor.

Referring to FIG. 2, the principle of operation will be described. FIG. 2 shows an equivalent circuit of the induction motor. In the explanation below, dots to be put over vector characters are omitted for the purpose of convenience. The voltage equation is expressed by Equation (1).

$$\begin{pmatrix} V_1 \\ 0 \end{pmatrix} = \begin{pmatrix} r_1 + j\omega_1 L_1 & j\omega_1 M \\ j\omega_1 M & r_2/S + j\omega_1 L_2 \end{pmatrix} \begin{pmatrix} I_1 \\ I_2 \end{pmatrix} \quad (1)$$

where $V_1$ is a voltage vector across the terminals of the induction motor, $I_1$ is a current vector of the primary currents of the induction motor, $I_2$ is a current vector of the secondary current of the induction motor, $r_1$ is a primary resistance, $L_1$ is a primary self-inductance, $r_2$ is a secondary resistance, $L_2$ is a secondary self-inductance, $l_1$ is a primary leakage inductance, $l_2$ is a secondary leakage inductance, M is a mutual inductance, S is a slip, and $\omega_{s1}$ is a slip angular velocity. In addition, $L_1 = l_1 + M$, $L_2 = l_2 + M$, and $S = \omega_{s1}/\omega_1$.

Equation (1) is a voltage equation of instantaneous space vectors on the orthogonal d-q axis coordinate system that rotates at the synchronous angular velocity $\omega_1$. Since Equation (1) is known in the art, the process of obtaining it is omitted here. Equation (1) can be expressed as Equation (3) when a flux vector $\phi_2$ satisfies Equation (2).

$$\phi_2 = MI_1 + L_2 I_2 \quad (2)$$

$$\begin{pmatrix} V_1 \\ 0 \end{pmatrix} = \begin{pmatrix} r_1 + j\omega_1(L_1 - M^2/L_2) & j\omega_1 M/L_2 \\ -r_2 & r_2/M + j\omega_{s1} L_2/M \end{pmatrix} \begin{pmatrix} I_1 \\ \phi_2 \end{pmatrix} \quad (3)$$

Here, in obtaining the second row of Equation (3), $SL_2/M$ is multiplied to both sides thereof.

Let us consider the primary voltage vector $V_1$ in the steady state by substituting Equations (4), (5) and (6) into Equation (3). Taking account of the fact that $\phi_{2q} = 0$ in the steady state, Equations (7) and (8) are obtained.

$$V_1 = v_{1d} + jv_{1q} \quad (4)$$

$$I_1 = i_{1d} + ji_{1q} \quad (5)$$

$$\phi_2 = \phi_{2d} + j\phi_{2q} \quad (6)$$

$$v_{1d} = r_1 i_{1d} - \omega_1 (L_1 - M^2/L_2) i_{1q} \quad (7)$$

$$v_{1q} = r_1 i_{1q} + \omega_1 (L_1 - M^2/L_2) i_{1d} + \omega^1 (M/L_2)\phi_{2d} \quad (8)$$

In Equations (7) and (8), $(L_1 - M_2/L_2) = 0$ because $M \gg l_1$ or $l_2$, the primary resistance $r_1$ is negligible, and the flux $\phi_{2d}$ in the steady state satisfies $\phi_{2d} = Mi_{1d}$, the primary voltage vector $V_1$ can be computed in a simpler way in accordance with Equations (9) and (10).

$$v_{1d} = 0 \quad (9)$$

$$v_{1q} = \omega_1 Mi_{1d} \quad (10)$$

Here, in obtaining Equation (10), $L_1 \sim M$ is taken into account.

If the primary currents of the induction motor are unstable, oscillation corresponding to the exciting current appears in $i_{1d}$. Accordingly, detecting the oscillation component $\Delta i_{1d}$ and correcting the q-axis voltage command value so that the oscillation is reduced makes it possible to stabilize the flux and the primary currents of the induction motor. In this case, the voltage command values $v_{1d}^*$ and $v_{1q}^*$ are given by the following equations (11) and (12).

$$v_{1d}^* = 0 \quad (11)$$

$$v_{1q}^* = v_{1q}^{**} - \Delta v \quad (12)$$

where $v_{1q}^{**} = \omega_1 M i_{1d}$, and $i_{1d}$ takes a fixed value under the constant flux control. In addition, $\Delta v = K \Delta i_{1d}$ where K is a correcting gain.

Although the correcting gain K is varied in proportion to the synchronous angular velocity $\omega_1$ when the flux is constant, it may be set at a fixed value regardless of $\omega_1$, depending on the type of a motor or load imposed on the motor.

Thus, this embodiment computes the primary voltage command value $V_1^*$ in accordance with Equations (11) and (12), and controls the induction motor by the command value. As a result, the flux in the induction motor is stabilized, and hence the primary currents of the induction motor are stabilized.

EMBODIMENT 2

Figure 3:
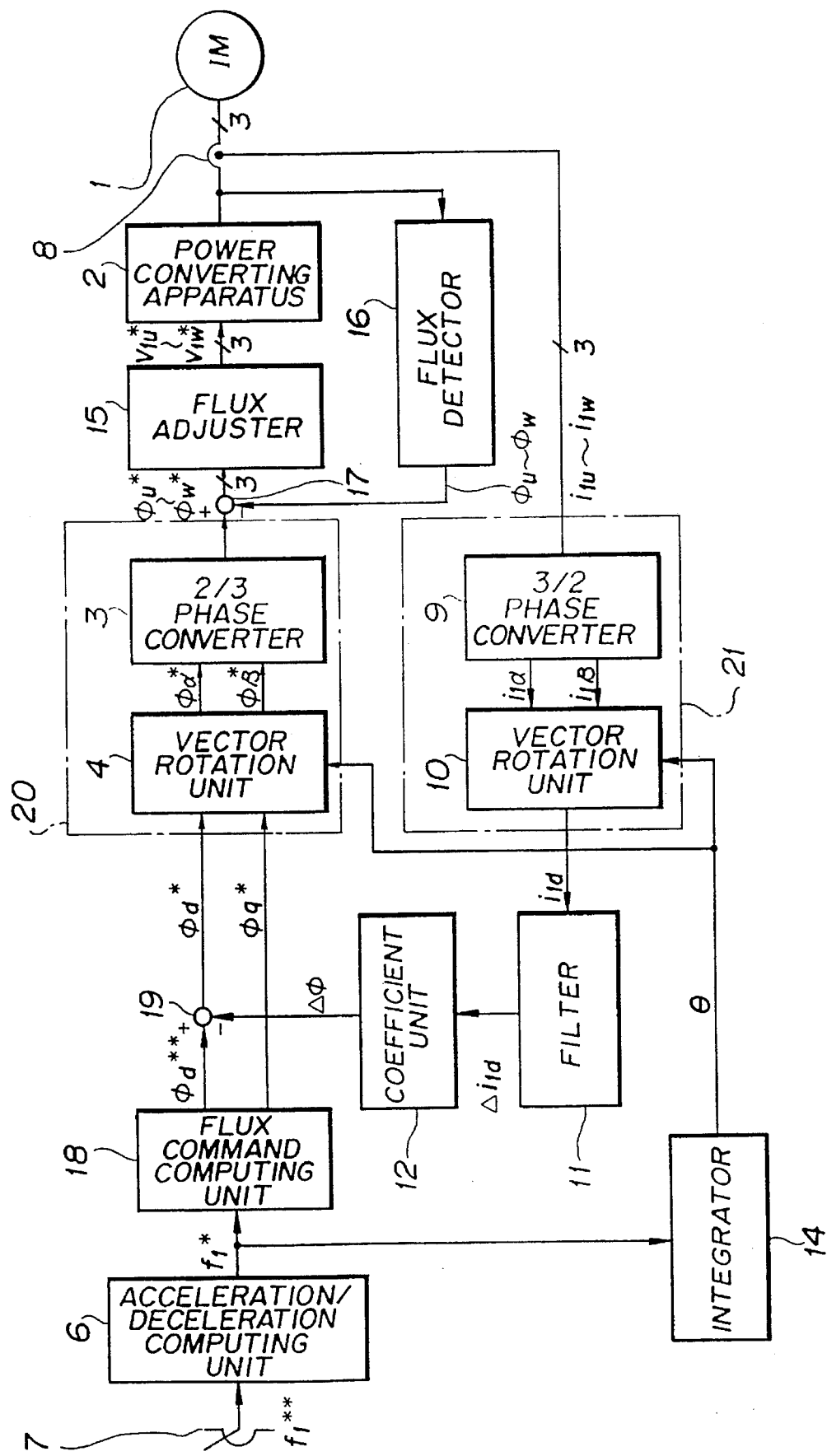
FIG. 3 is a block diagram showing a second embodiment in accordance with the present invention.

FIG. 3 is a block diagram showing a second embodiment in accordance with the present invention.

This embodiment comprises a flux control system plus a limiting function of the oscillation component of the exciting current. Since Equation $\phi_{2d} = M i_{1d}$ holds in the steady state as mentioned above, the exciting current oscillation component $\Delta i_{1d}$ can be assumed to be the flux oscillation component $\Delta \phi$ by setting as K=M. The flux in the steady state is given by Equations (13) and (14) by integrating Equations (9) and (10).

$$\phi_d = M i_{1d} \quad (13)$$

$$\phi_q = 0 \quad (14)$$

When V/f is constant, the flux will be stabilized by correcting a flux command value $\phi d^{**}$ in a manner similar to the correction of the oscillation component of the exciting current. In this case, the flux command values are given by Equations (15) and (16).

$$\phi_d^* = \phi_d^{**} - \Delta \phi \quad (15)$$

$$\phi_q^* = 0 \quad (16)$$

where $\Delta \phi = K \Delta i_{1d}$, and K is a correcting gain.

In FIG. 3, a flux command computing unit 18 computes the command values in accordance with Equations (13) and (14), and outputs them. It is not different from the prior art in that the flux command values are varied in inverse proportion to the output frequency in a fixed output range. The coefficient unit 12 transforms the current oscillation component $\Delta i_{1d}$ to a flux correcting quantity $\Delta \phi$, thereby changing $\Delta i_{1d}$ into a flux oscillation correlate. The flux correcting quantity $\Delta \phi$ is subtracted from the d-axis flux command $\phi_d^{**}$ by the adder 19. Thus, the adder 19 outputs the d-axis flux command $\phi_d^*$ which is corrected by the correcting quantity $\Delta \phi$.

The flux command values $\phi_d^*$ and $\phi_q^*$ on the rotating orthogonal d-q axis coordinate system are converted into flux command values $\phi_u^* - \phi_w^*$ by the coordinate transformation unit 20 comprising the vector rotation unit 4 and the two phase to three phase converter 3. A flux detector 16 detects the flux $\phi_u - \phi_w$ of respective phases from the output voltage of the power converting apparatus 2. An adder 17 subtracts the detected flux values from the flux command values, and supplies the difference to a flux adjuster 15. The output of the flux adjuster 15 is fed to the power converting apparatus 2 as voltage command values $v_{1u}^* - v_{1w}^*$ and the induction motor is driven by the power converting apparatus 2.

EMBODIMENT 3

Figure 4:
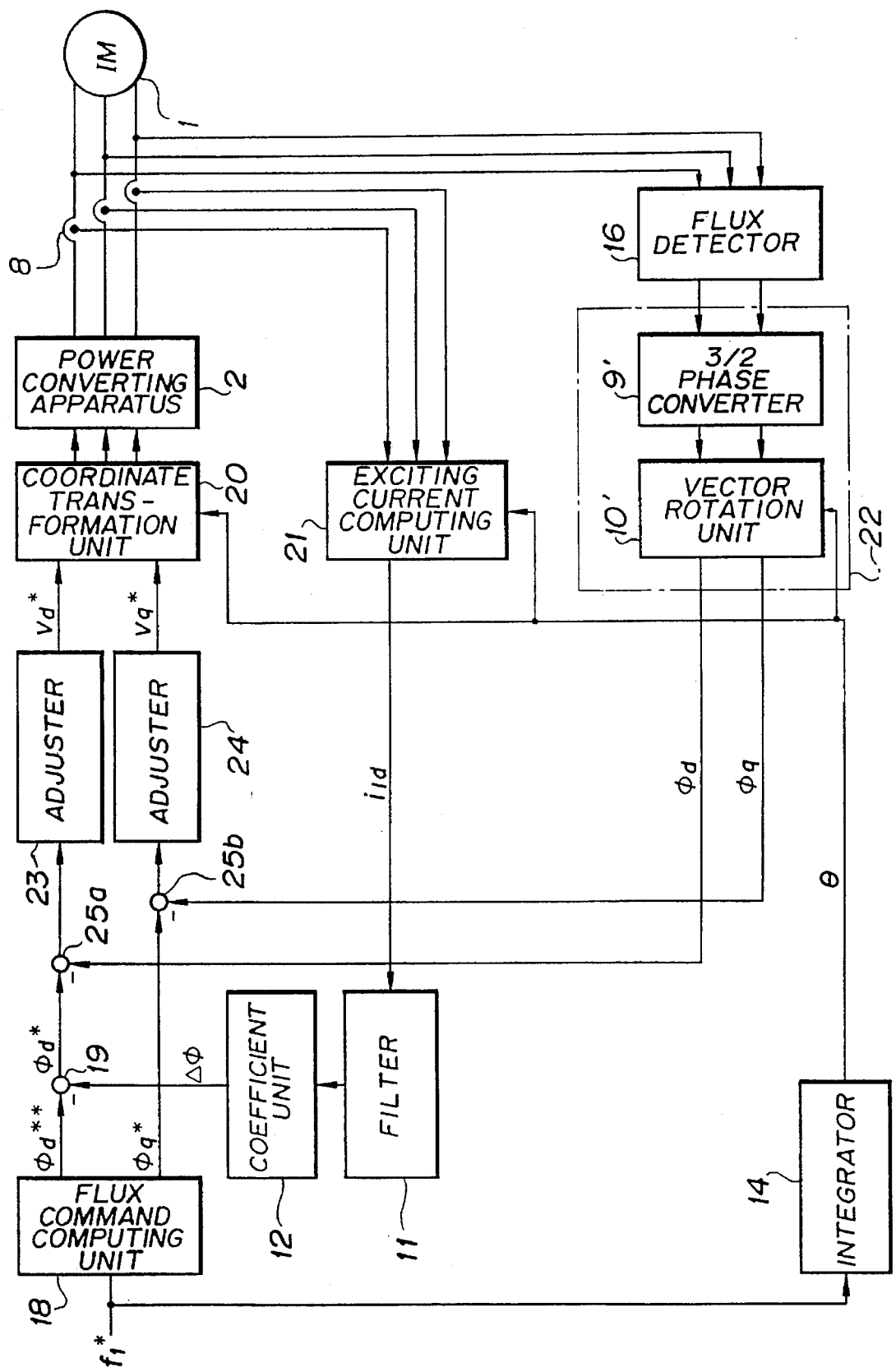
FIG. 4 is a block diagram showing a third embodiment in accordance with the present invention.

FIG. 4 is a block diagram showing a fourth embodiment in accordance with the present invention. This embodiment realizes the flux control system as shown in FIG. 3 in another arrangement.

More specifically, the output of the flux detector 18 is resolved into d and q axis components by a rotation coordinate transformation unit 22 comprising a three phase to two phase converter 9' and a vector rotation unit 10'. The d axis component $\phi_d$ is subtracted on the d-q axis coordinate system from the output $\phi_d^*$ of the adder 19 by an adder 25a, and the q axis component $\phi_q$ is subtracted on the d-q axis coordinate system from the output $\phi_q^*$ of the flux command computing unit 18 by an adder 25b. Adjusters 23 and 24 perform flux control on the basis of the outputs of the adders 25a and 25b.

With this arrangement, the coefficient unit 12 transforms the oscillation component of the exciting current into the correcting quantity $\Delta \phi$. The adder 19 subtracts this correcting quantity from the d-axis flux command value $\phi_d^{**}$ so that the d-axis flux command value is corrected. Thus, this embodiment can achieve effects similar to those of the second embodiment shown in FIG. 3.

EMBODIMENT 4

Figure 5:
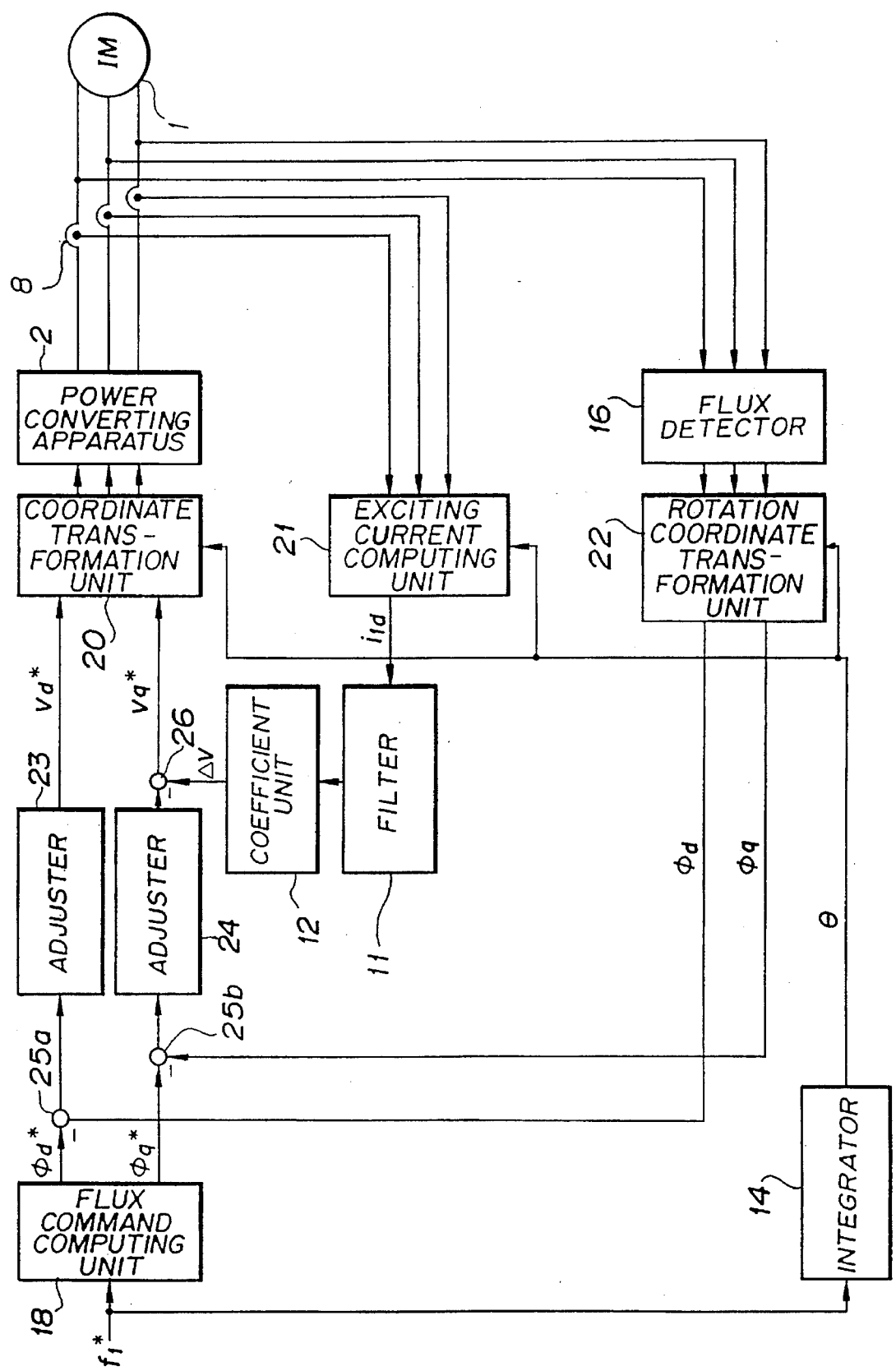
FIG. 5 is a block diagram showing a fourth embodiment in accordance with the present invention.

FIG. 5 is a block diagram showing a fourth embodiment in accordance with the present invention. This embodiment differs from the third embodiment in FIG. 4 in that it corrects the q-axis voltage command value by an adder 26. Specifically, the adder 26 subtracts the correcting quantity $\Delta v$ from the q-axis voltage command value outputted from the adjuster 24, and outputs a corrected q-axis voltage command value $v_q^*$. Here the correcting quantity $\Delta v$ outputted from the coefficient unit 12 corresponds to the oscillation component of the exciting current. Thus, effects similar to those of FIG. 3 can be obtained.

EMBODIMENT 5

Figure 6:
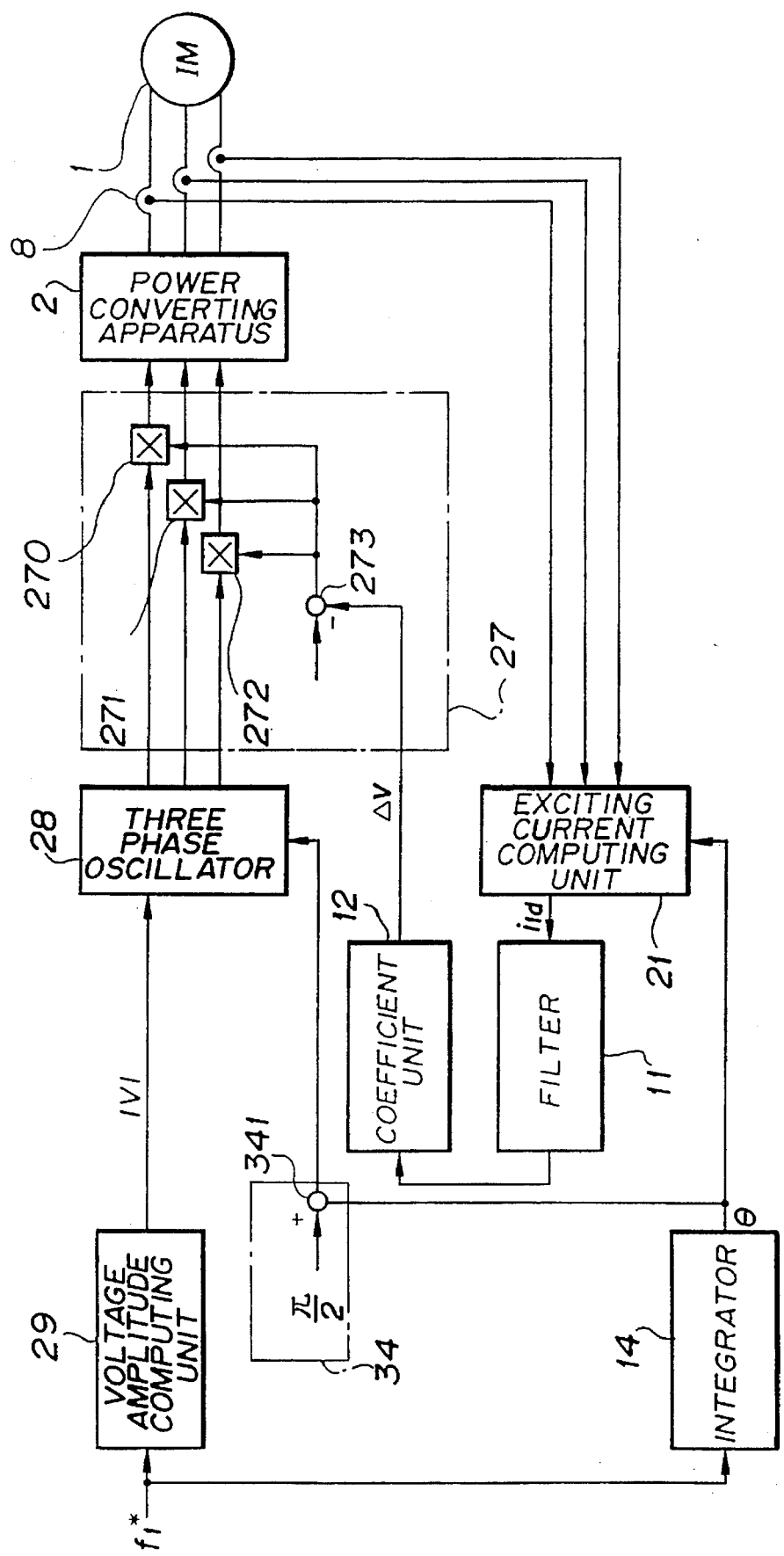
FIG. 6 is a block diagram showing a fifth embodiment in accordance with the present invention.

FIG. 6 is a block diagram showing a fifth embodiment in accordance with the present invention. This embodiment realizes the computation and correction of stator axis voltage command values in the first embodiment shown in FIG. 1 by using another arrangement. This arrangement is implemented in view of the fact that $v_{1d} = 0$ as expressed by Equation (9).

In FIG. 6, a voltage amplitude computing unit 29 computes a desired voltage amplitude |V| against the output frequency command value f*. Here, the output of the coefficient unit 12 is the fluctuation quantity of the flux or the exciting current. The output $\Delta v$ of the coefficient unit 12 should be subtracted, as a correcting quantity, from the voltage $v_{1q}$ that corresponds to the exciting voltage. In this case, the phase of the output of the integrator 14 must be advanced by $\pi/2$ by a phase shifter 34. The phase shifter comprises an adder 341.

The voltage amplitude |V| and the output of the phase shifter 34 are inputted to a three-phase oscillator 28. The three-phase oscillator 28 outputs stator axis voltage command values. The stator axis voltage command values are corrected by a correcting unit 27. The correcting unit 27 subtracts the output of the coefficient unit 12 from the value 1 by an adder 273. Thus, the coefficient for the stator axis voltage command values is obtained. Here, the output of the coefficient unit 12 is the correcting quantity of the oscillation component of the exciting current. The stator axis voltage command values are corrected by multipliers 270–272. Thus, effects similar to those of FIG. 1 can be achieved.

EMBODIMENT 6

Figure 7:
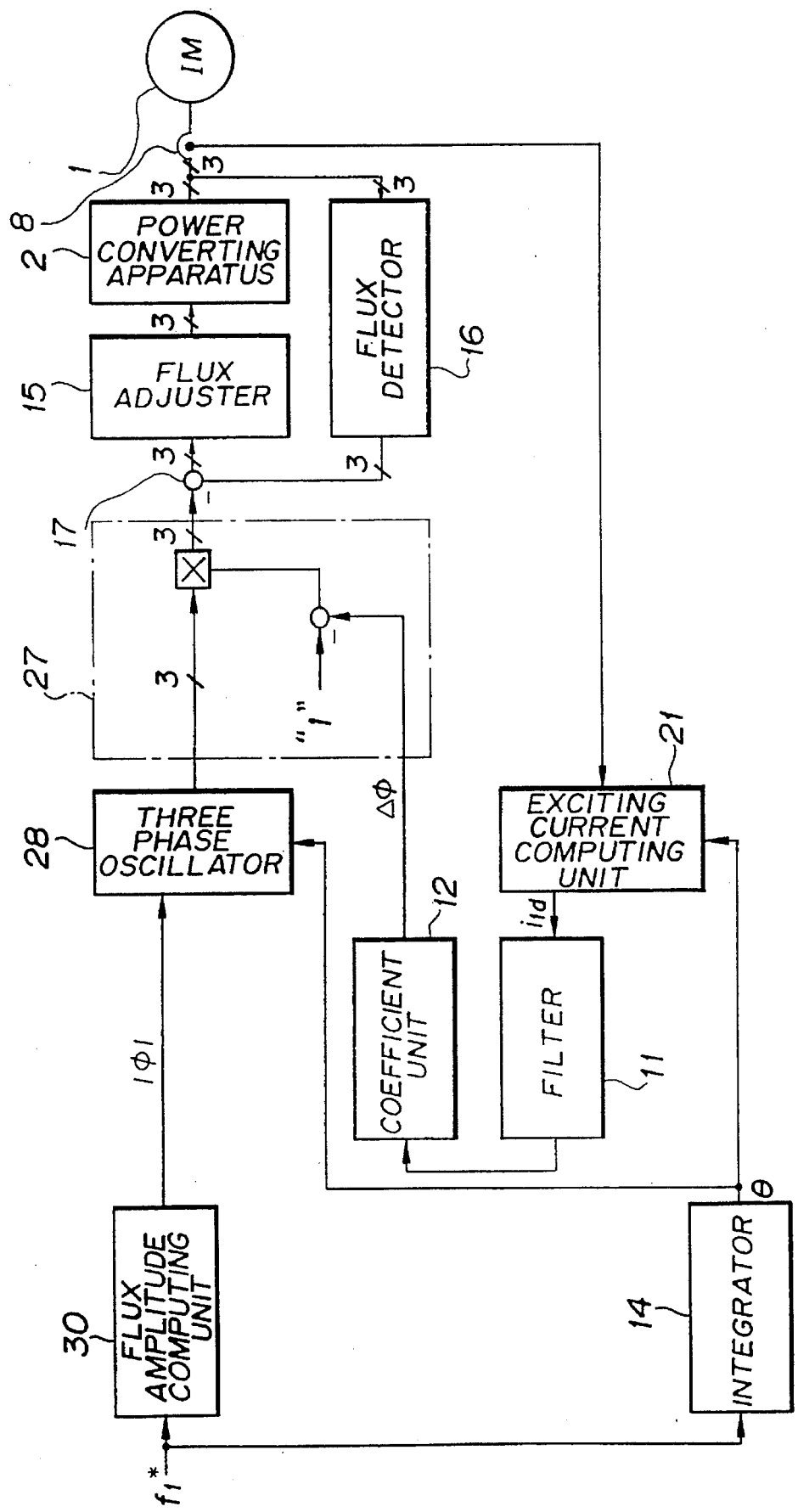
FIG. 7 is a block diagram showing a sixth embodiment in accordance with the present invention.

FIG. 7 is a block diagram of a sixth embodiment in accordance with the present invention. This embodiment realizes the computation and correction of stator flux command values in the second embodiment shown in FIG. 3 by using another arrangement. This arrangement is implemented in view of the fact that $\phi_q=0$ as expressed by Equation (14).

In FIG. 7, a flux amplitude computing unit 30 computes a desired flux amplitude $|\phi|$ against the output frequency command value f*. The flux amplitude $|\phi|$ and a reference phase angle $\theta$ are inputted to the three-phase oscillator 28 which outputs stator flux command values. The stator flux command values are corrected by the correcting unit 27. This embodiment achieves effects similar to those of FIG. 3.

EMBODIMENT 7

Figure 8:
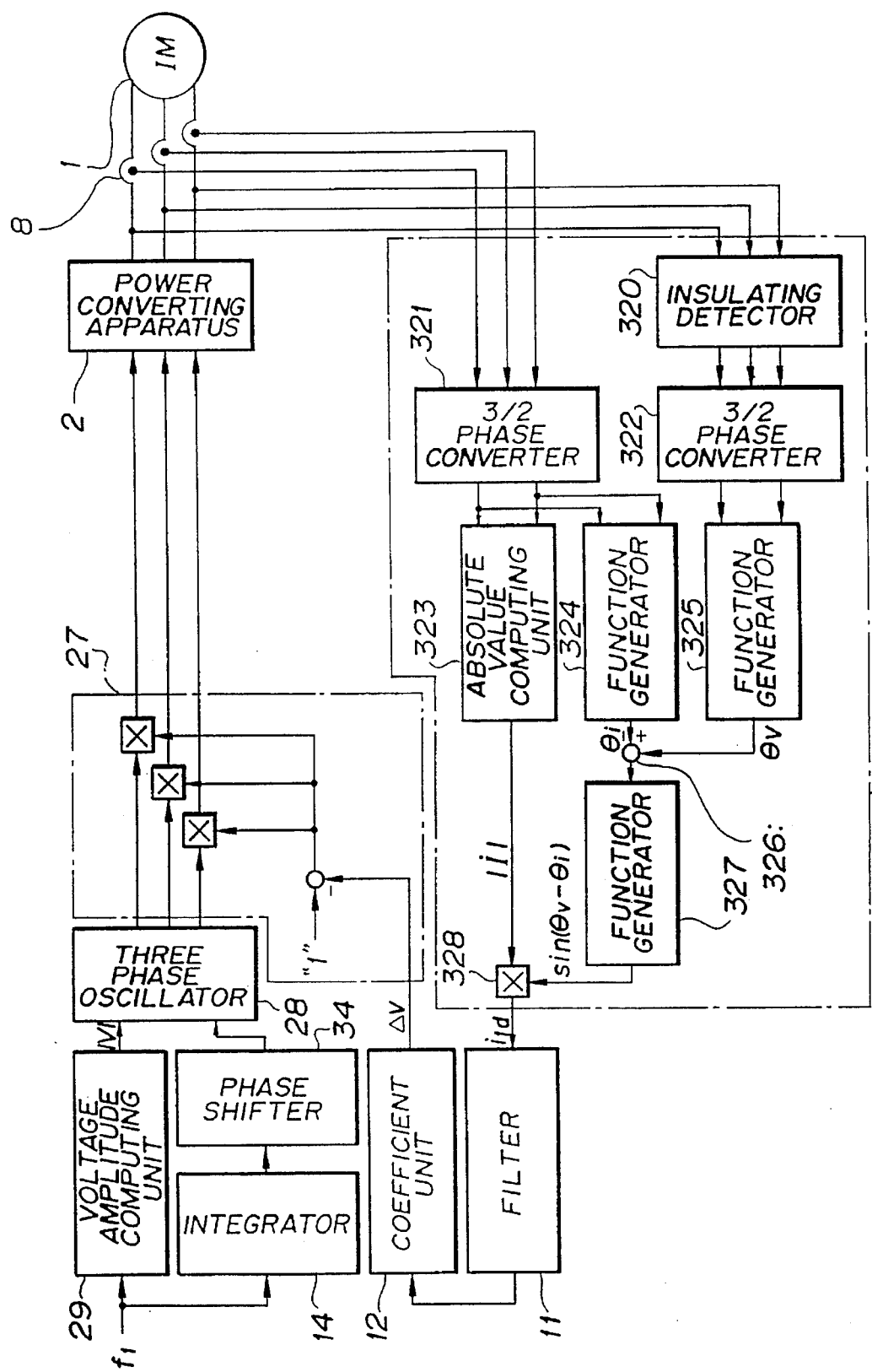
FIG. 8 is a block diagram showing a seventh embodiment in accordance with the present invention.

FIG. 8 is a block diagram showing a seventh embodiment in accordance with the present invention. This embodiment realizes the exciting current computing unit 21 in the fifth embodiment shown in FIG. 6 by using another arrangement.

Figure 9:
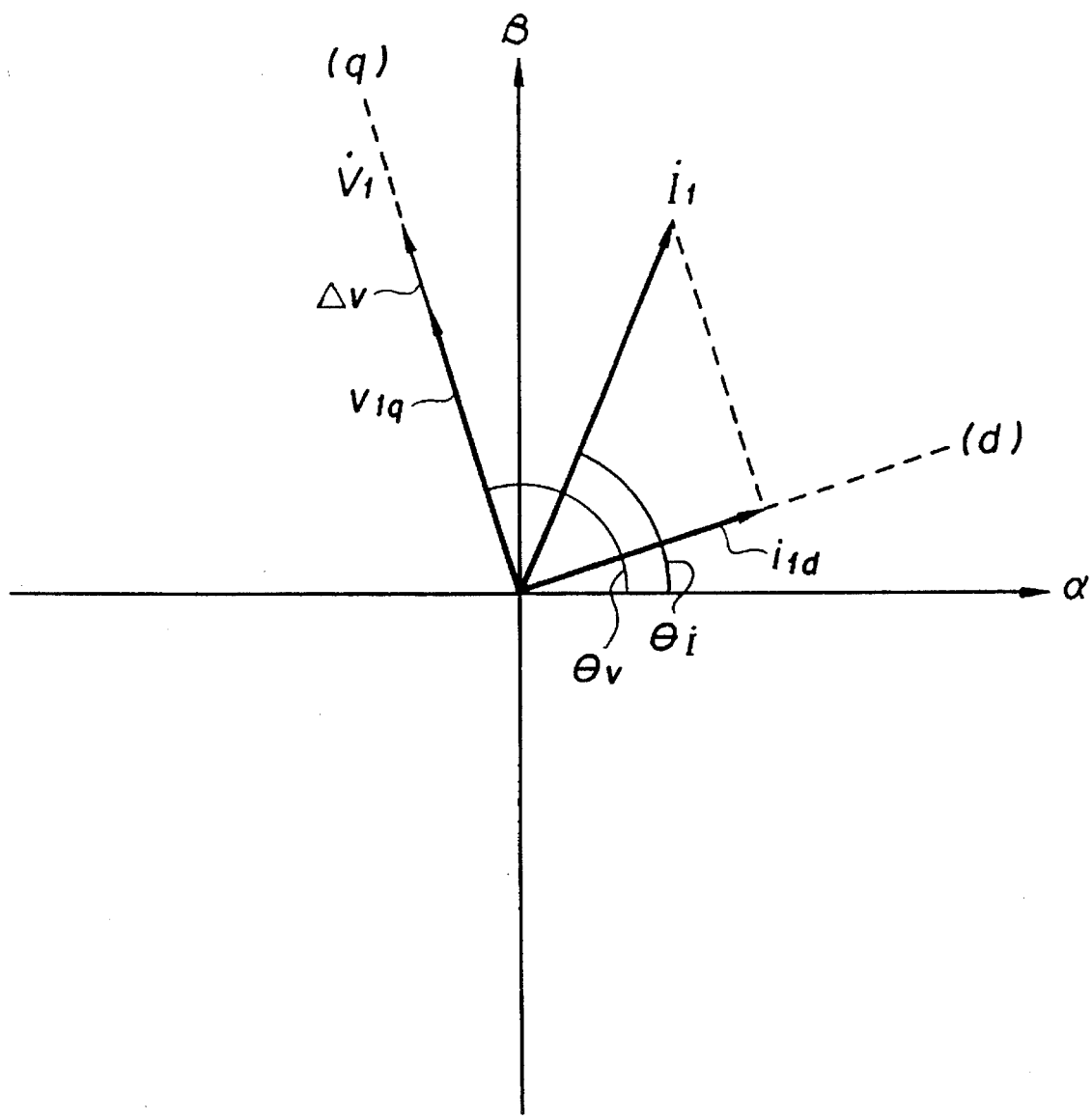
FIG. 9 is a vector diagram illustrating a voltage vector and a current vector for explaining the computation of an exciting current.

The idea of computing of the exciting current is explained with reference to the vector diagram of FIG. 9. In FIG. 9, $\alpha$-$\beta$ axes constitute a stator orthogonal coordinate system, and d-q axes constitute an orthogonal coordinate system that rotates at the synchronous speed. The vector diagram illustrates the relationship between the voltage vector $V_1$ and the current vector $I_1$, which are given by Equations (4) and (5). The exciting current correlate $i_{1d}$ is given by the following Equation (17).

$$i_{1d}=|I_1|\times\sin(\theta v-\theta i) \tag{17}$$

where $\theta v$ is the phase of the voltage vector with reference to the $\alpha$ axis, and the $\theta i$ is the phase of the current vector with reference to the $\alpha$ axis.

The phases $\theta v$ and $\theta i$, and the absolute value $|I_1|$ are given by Equations (18), (19) and (20).

$$\theta v = \tan^{-1}(v_{1\beta}/v_{1\alpha}) \tag{18}$$

$$\theta i = \tan^{-1}(i_{1\beta}/i_{1\alpha}) \tag{19}$$

$$|I_1| = \sqrt{(i_{1\alpha}^2 + i_{1\beta}^2)} \tag{20}$$

where $v_{1\alpha}$ and $v_{1\beta}$ are $\alpha$ and $\beta$ axis components of the voltage vector, respectively, and $i_{1\alpha}$ and $i_{1\beta}$ are $\alpha$ and $\beta$ axis components of the current vector, respectively.

The seventh embodiment in FIG. 8 is implemented in accordance with Equations (17)–(20).

Next, an exciting current computing unit 32 will be explained. The voltage across the terminals of the induction motor is detected by an insulating detector 320. The detected values of the primary currents and primary voltages of the induction motor are transformed to those on the $\alpha$-$\beta$ axis coordinate system by three-phase to two-phase converters 321 and 322, respectively. The output of the three-phase to two-phase converter 321 is input to an absolute value computing unit 323 and a function generator 324. The absolute value computing unit 323 computes the absolute value $|I_1|$ of the current vector, and the function generator 324 generates the phase $\theta i$ of the current vector. The output of the three-phase to two-phase converter 322 is inputted to a function generator 325 which generates the phase $\theta v$ of the voltage vector.

The phases $\theta i$ and $\theta v$ are converted into $\sin(\theta v-\theta i)$ by an adder 326 and a function generator 327. A multiplier 328 multiplies the output of the absolute value computing unit 323 by the output of the function generator 327, and output the product as an exciting current correlate $i_{1d}$. The exciting current correlate $i_{1d}$ is input to the correcting unit 27 through the filter 11 and the coefficient unit 12.

EMBODIMENT 8

Figure 10:
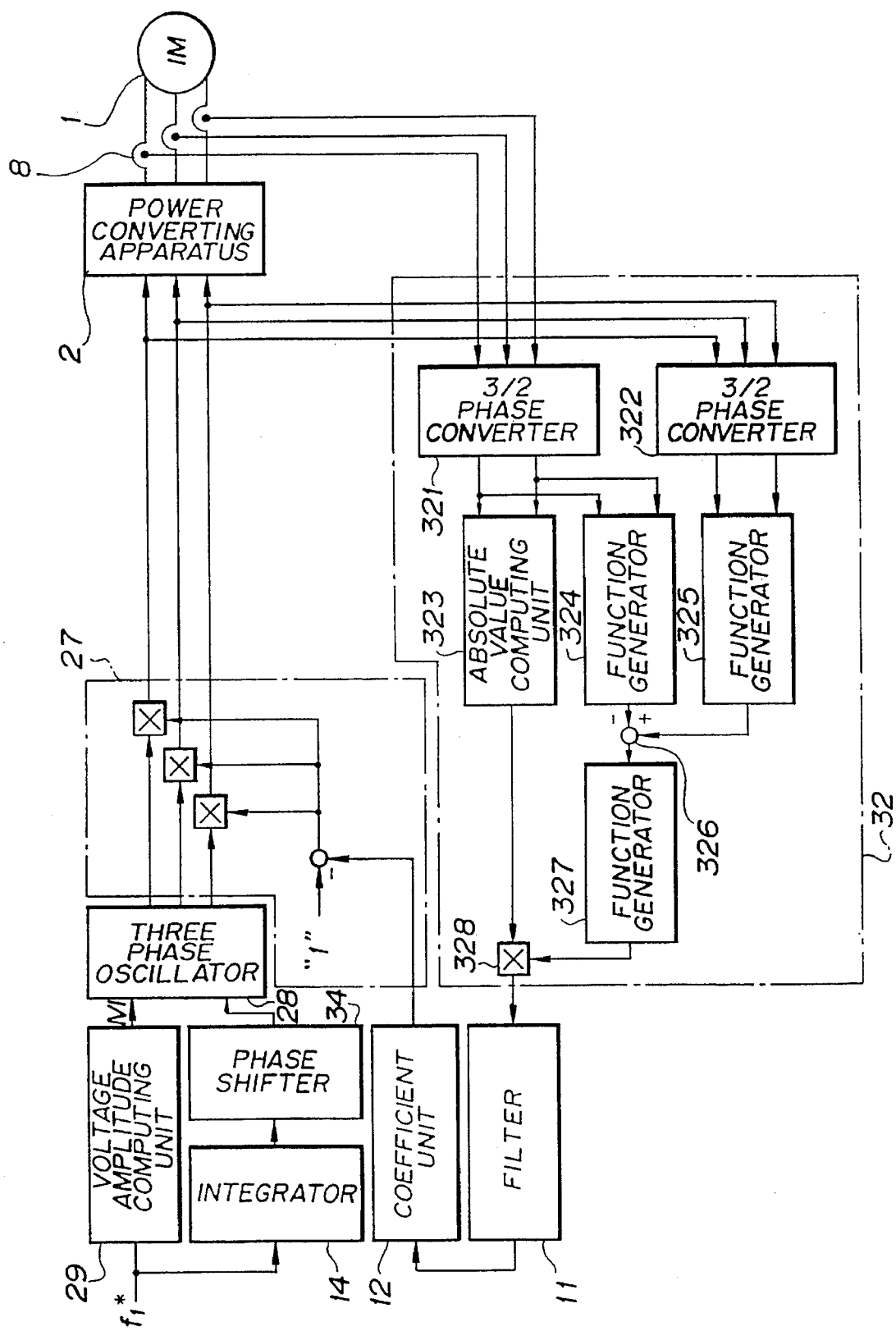
FIG. 10 is a block diagram showing an eighth embodiment in accordance with the present invention.

FIG. 10 is a block diagram showing an eighth embodiment in accordance with the present invention. This embodiment uses the output of the correcting unit 27 instead of the detected value of the motor terminal voltages. Thus, the embodiment can achieve effects similar to those of the second embodiment in FIG. 3 in the case where the motor terminal voltages cannot be detected in the seventh embodiment of FIG. 8.

EMBODIMENT 9

Figure 11:
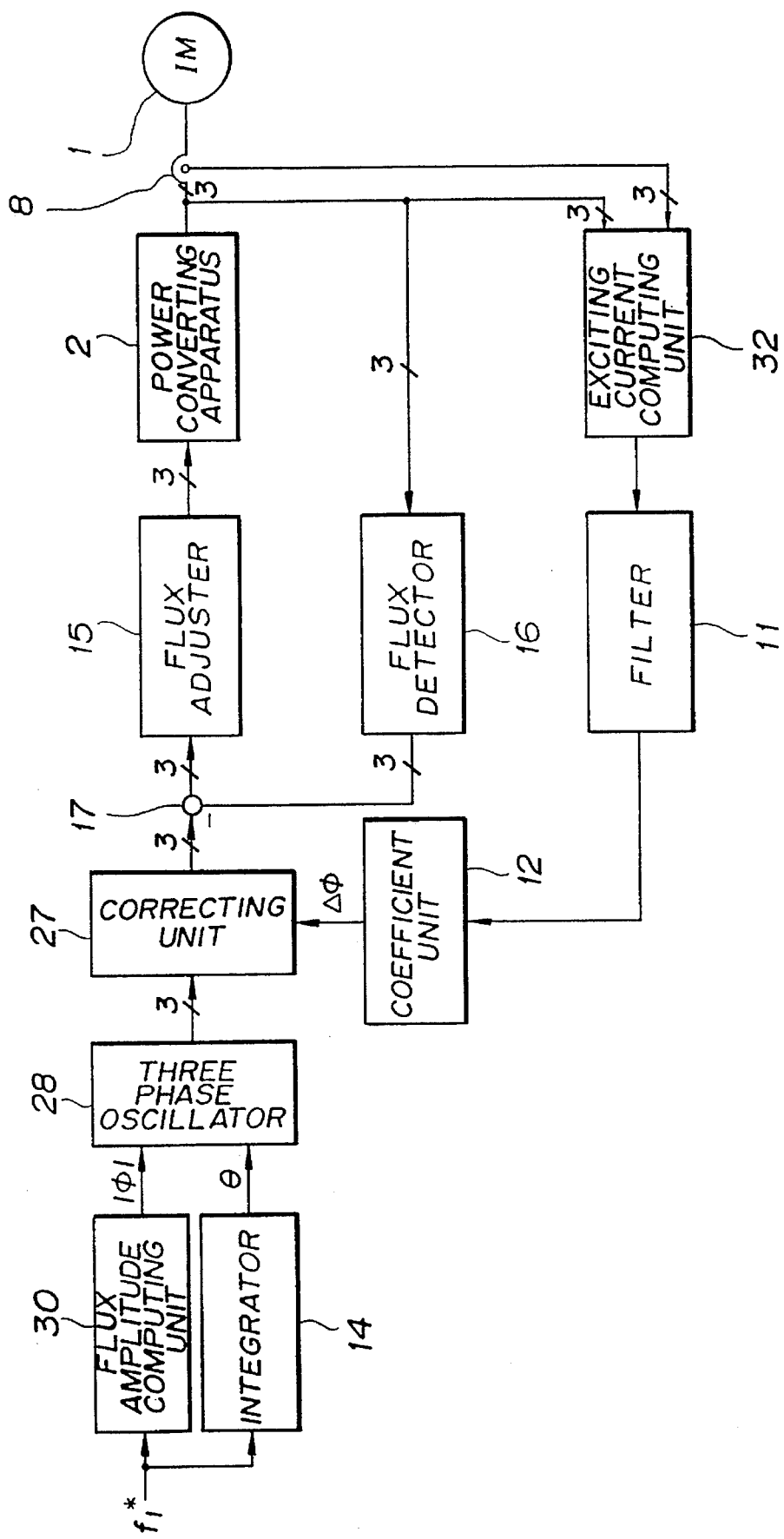
FIG. 11 is a block diagram showing a ninth embodiment in accordance with the present invention.

FIG. 11 is a block diagram showing a ninth embodiment in accordance with the present invention. This embodiment realizes the exciting current computing unit 21 in the sixth embodiment shown in FIG. 7 by using another arrangement. The arrangement is the same as that of the exciting current computing unit 32 described in the seventh embodiment shown in FIG. 8. This embodiment can achieve effects similar to those of the third embodiment shown in FIG. 4.

EMBODIMENT 10

Figure 12:
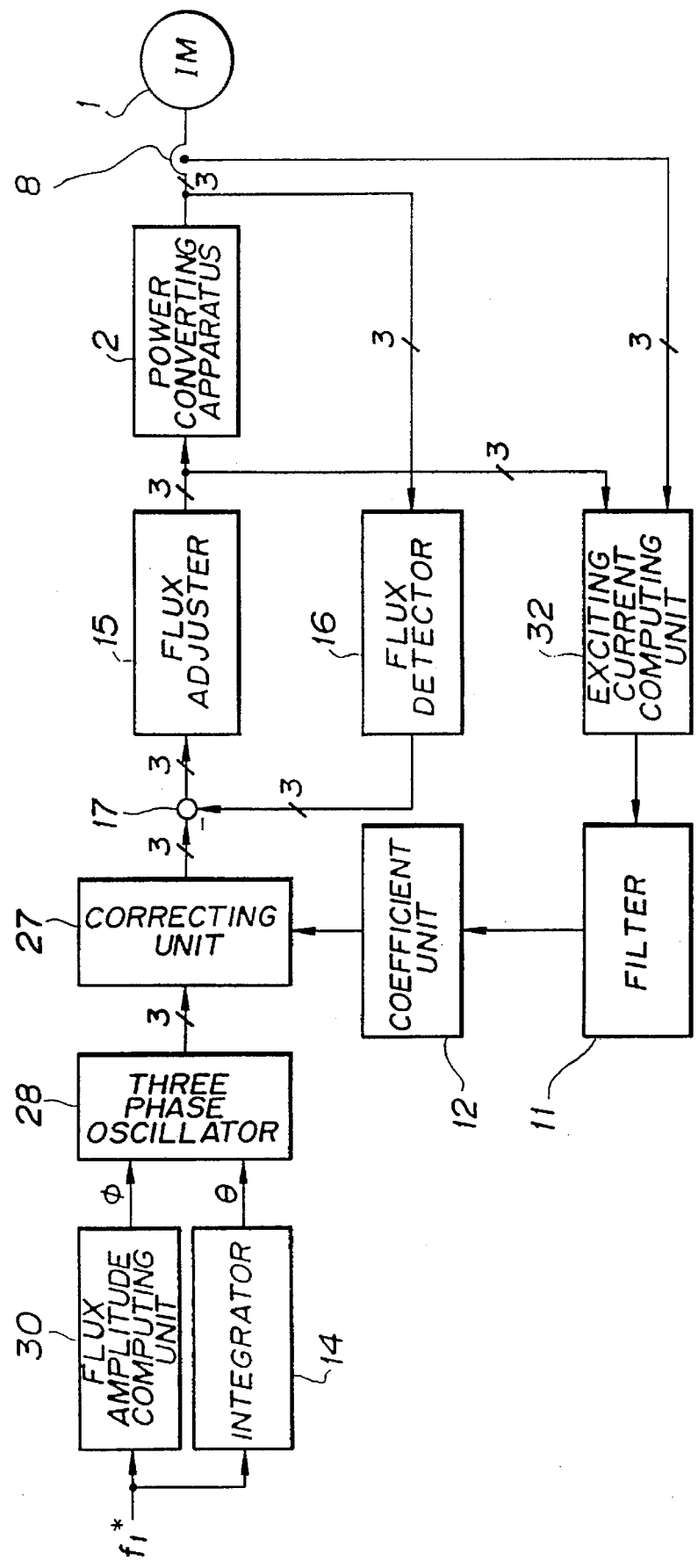
FIG. 12 is a block diagram showing a tenth embodiment in accordance with the present invention.

FIG. 12 is a block diagram showing a tenth embodiment in accordance with the present invention. This embodiment provides the exciting current computing unit 32 with the output of the flux adjuster 15 instead of the detected values of the motor terminal voltages of the ninth embodiment shown in FIG. 11. Thus, the embodiment can achieve effects similar to those of the third embodiment in FIG. 4 in the case where the motor terminal voltages cannot be detected in the ninth embodiment of FIG. 11.

EMBODIMENT 11

Figure 13:
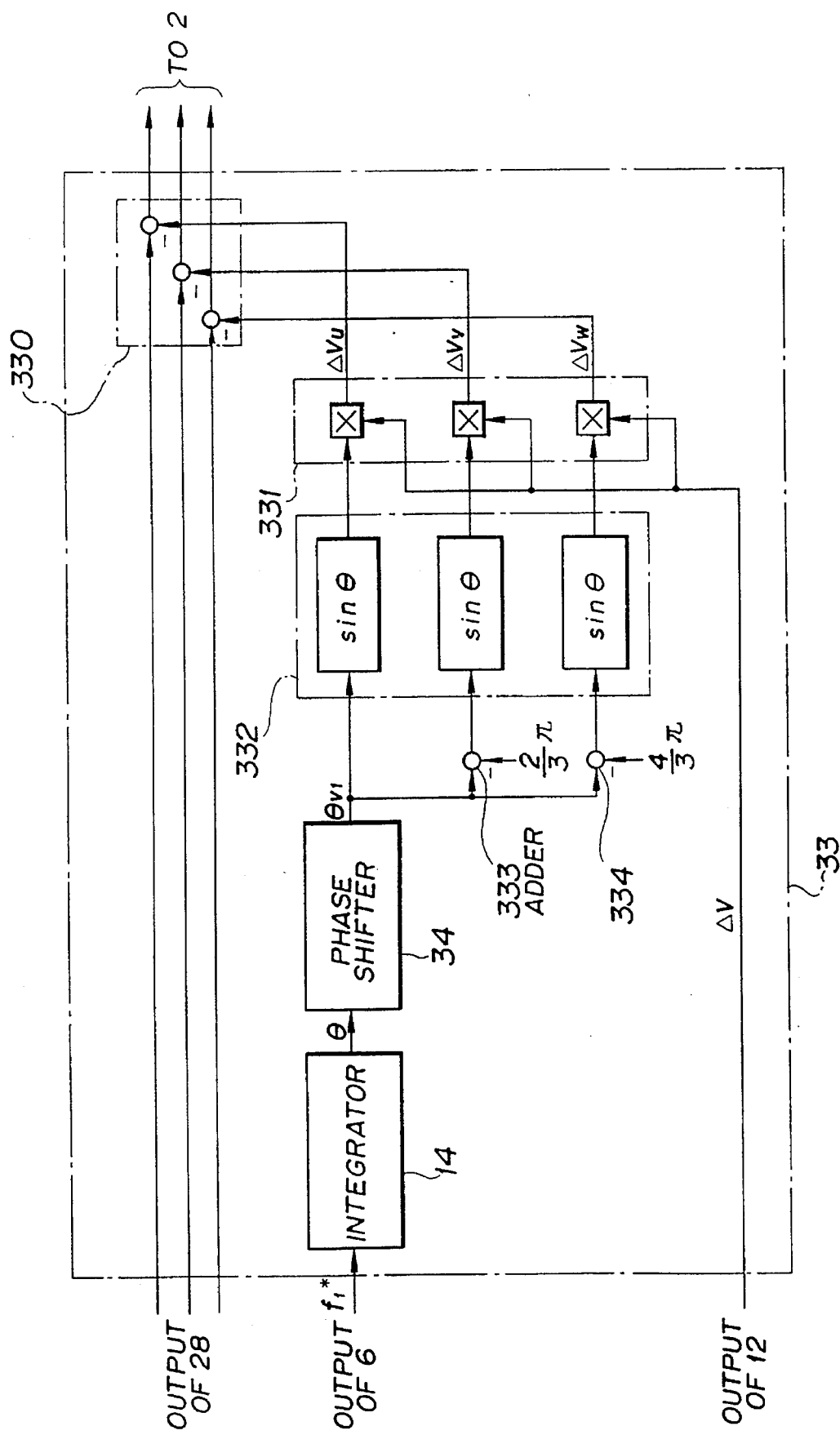
FIG. 13 is a block diagram showing a major portion of an eleventh embodiment in accordance with the present invention.

FIG. 13 is a block diagram showing an eleventh embodiment in accordance with the present invention. This embodiment realizes the correcting unit 27 of the fifth embodiment shown in FIG. 6 by another arrangement.

The embodiment will be described with reference to the vector diagram of FIG. 9. In FIG. 9, the phase of the voltage vector $V_1$ advances with regard to the phase of the exciting current correlate $i_{1d}$ by $\pi/2$. The phase of the correcting quantity $\Delta v$ based on the oscillation component of the exciting current, however, is identical with the phase of the stator axis voltage command value. Accordingly, the correcting quantity of each phase is given by Equations (21), (22) and (23).

$$\Delta v_u=\Delta v\times\sin(\theta_{v1}) \tag{21}$$

$$\Delta v_v=\Delta v\times\sin(\theta_{v1}-2\pi/3) \tag{22}$$

$$\Delta v_w = \Delta v \times \sin(\theta_{v1} - 4\pi/3) \quad (23)$$

where $\Delta v$ is a correcting value, $\theta v1$ is a reference phase angle of the voltage command value, $\Delta v_u$ is a correcting quantity of the U-phase, $\Delta v_v$ is a correcting quantity of the V-phase, $\Delta v_w$ is a correcting quantity of the W-phase.

Next, the construction of the correcting unit 33 will be described with reference to FIG. 13. The output of the acceleration and deceleration computing unit 6 is inputted to a phase shifter 34 via the integrator 14. The phase shifter 34 outputs the reference phase angle $\theta v1$. The phase of the output of the phase shifter 34 is further shifted by adders 333 and 334 by $2\pi/3$ and $4\pi/3$, respectively. The outputs of the phase shifter 34, the adders 333 and 334 are inputted to the function generator 332, and the outputs thereof are fed to a multiplying unit 331. The multiplying unit includes three multipliers which multiply the respective outputs of the function generator 332 by the output $\Delta v$ of the coefficient unit 12. Thus, correcting values of respective phases $\Delta v_u$, $\Delta v_v$ and $\Delta v_w$ are obtained. The output of the three-phase oscillator 28 are corrected by the correcting values $\Delta v_u$, $\Delta v_v$ and $\Delta v_w$. Thus, the correcting unit 33 can achieve effects similar to those of the correcting unit 27. The correcting unit 27 in FIGS. 8 and 10 may be replaced with the correcting unit 33.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A control circuit for controlling a power converting apparatus in response to one or more command values, said control circuit comprising:

exciting current obtaining means for obtaining an exciting current component from a detected signal of each phase of primary currents of an induction motor, wherein said exciting current obtaining means comprises vector rotation means for resolving said primary currents of said induction motor into a d-axis component and a q-axis component on an orthogonal d-q axis coordinate system by using a reference angle that rotates at an angular velocity identical with that of an output of said power converting apparatus, and outputs said d-axis component of said primary currents of said induction motor as said exciting current component;

oscillation component obtaining means for obtaining an oscillation component of the exciting current from said exciting current component;

correcting quantity obtaining means for obtaining a correcting quantity from said oscillation component of the exciting current, wherein said correcting quantity obtaining means obtains from said oscillation component of the exciting current an exciting voltage oscillation component $\Delta v$, and outputs said exciting voltage oscillation component $\Delta v$ as said correcting quantity; and command providing means for correcting at least one of said command values using said correcting quantity, and for providing said power converting apparatus with stator axis voltage command values obtained on the basis of said corrected command values, wherein said command providing means comprises correcting means for correcting said command values, which are provided in the form of a q-axis voltage command value and a d-axis voltage command value on said orthogonal d-q axis coordinate system, in a manner that said q-axis voltage command is corrected by said exciting voltage oscillation component $\Delta v$ while said d-axis voltage command value is set to zero, and coordinate transformation mean for transforming said corrected q-axis voltage command value and said d-axis voltage command value into said stator axis voltage command values.

2. A control circuit for controlling a power converting apparatus in response to one or more command values, said control circuit comprising:

flux detecting means for detecting flux of each phase of said induction motor;

exciting current obtaining means for obtaining an exciting current component from a detected signal of each phase of primary currents of an induction motor, wherein said exciting current obtaining means comprises vector rotation means for resolving said primary currents of said induction motor into a d-axis component and a q-axis component on an orthogonal d-q axis coordinate system by using a reference angle that rotates at an angular velocity identical with that of an output of said power converting apparatus, and outputs the d-axis component of said primary currents of said induction motor as said exciting current component;

oscillation component obtaining means for obtaining an oscillation component of the exciting current from said exciting current component;

correcting quantity obtaining means for obtaining a correcting quantity from said oscillation component of the exciting current, wherein said correcting quantity obtaining means obtains from said oscillation component of the exciting current a flux oscillation component $\Delta \phi$, and outputs said flux oscillation component $\Delta \phi$ as said correcting quantity; and command providing means for correcting at least one of said command values using said correcting quantity, and for providing said power converting apparatus with stator axis voltage command values obtained on the basis of said corrected command values, wherein said command providing means comprises correcting means for correcting said command values, which are provided in the form of a d-axis flux command value and a q-axis flux command value on said orthogonal d-q axis coordinate system, in a manner that said d-axis voltage command is corrected by said flux oscillation component $\Delta \phi$ while said q-axis flux command value is set to zero, coordinate transformation mean for transforming said corrected d-axis flux command value and said q-axis flux command value into stator axis flux command values, and adjusting means for changing a difference between each of said stator axis flux command values and each flux detected by said flux detecting means into said stator axis voltage command values.

3. A control circuit for controlling a power converting apparatus in response to one or more command values, said control circuit comprising:

flux detecting means for detecting flux of each phase of said induction motor;

exciting current obtaining means for obtaining an exciting current component from a detected signal of each phase of primary currents of an induction motor, wherein said exciting current obtaining means comprises vector rotation means for resolving said primary currents of said induction motor into a d-axis component and a q-axis component on an orthogonal d-q axis coordinate system by using a reference angle that rotates at an angular velocity identical with that of an output of said power converting apparatus, and outputs the d-axis component of said primary currents of said induction motor as said exciting current component;

oscillation component obtaining means for obtaining an oscillation component of the exciting current from said exciting current component;

correcting quantity obtaining means for obtaining a correcting quantity from said oscillation component of the exciting current, wherein said correcting quantity obtaining means obtains from said oscillation component of the exciting current a flux oscillation component $\Delta\phi$, and outputs said flux oscillation component $\Delta\phi$ as said correcting quantity; and command providing means for correcting at least one of said command values using said correcting quantity, and for providing said power converting apparatus with stator axis voltage command values obtained on the basis of said corrected command values, wherein said command providing means comprises correcting means for correcting said command values, which are provided in the form of a d-axis flux command value and a q-axis flux command value on said orthogonal d-q axis coordinate system, in a manner that said d-axis voltage command is corrected by said flux oscillation component $\Delta\phi$, means for obtaining a difference between said corrected d-axis flux command value and a d-axis flux detected by said detecting means, and a difference between said q-axis flux command value and a q-axis flux detected by said detecting means, adjusting means for changing each of said differences into d-axis and q-axis voltage command values, and coordinate transformation means for transforming said d-axis and q-axis voltage command values into said stator axis voltage command values.

4. A control circuit for controlling a power converting apparatus in response to one or more command values, said control circuit comprising:

flux detecting means for detecting flux of each phase of said induction motor;

exciting current obtaining means for obtaining an exciting current component from a detected signal of each phase of primary currents of an induction motor, wherein said exciting current obtaining means comprises vector rotation means for resolving said primary currents of said induction motor into a d-axis component and a q-axis component on an orthogonal d-q axis coordinate system by using a reference angle that rotates at an angular velocity identical with that of an output of said power converting apparatus, and outputs the d-axis component of said primary currents of said induction motor as said exciting current component;

oscillation component obtaining means for obtaining an oscillation component of the exciting current from said exciting current component;

correcting quantity obtaining means for obtaining a correcting quantity from said oscillation component of the exciting current, wherein said correcting quantity obtaining means obtains from said oscillation component of the exciting current an exciting voltage oscillation component $\Delta v$, and outputs said exciting voltage oscillation component $\Delta v$ as said correcting quantity; and command providing means for correcting at least one of said command values using said correcting quantity, and for providing said power converting apparatus with stator axis voltage command values obtained on the basis of said corrected command values, wherein said command providing means comprises means for obtaining a difference between said d-axis flux command value and a d-axis flux detected by said detecting means, and a difference between said q-axis flux command value and a q-axis flux detected by said detecting means, adjusting means for changing each of said differences into a d-axis voltage command value and a q-axis voltage command value, correcting means for correcting said q-axis voltage command value by said voltage correcting quantity $\Delta v$, and coordinate transformation means for transforming said d-axis voltage command value and said corrected q-axis voltage command value into said stator axis voltage command values.

5. A control circuit for controlling a power converting apparatus in response to one or more command values, said control circuit comprising:

exciting current obtaining means for obtaining an exciting current component from a detected signal of each phase of primary currents of an induction motor, wherein said exciting current obtaining means comprises vector rotation means for resolving said primary currents of said induction motor into a d-axis component and a q-axis component on an orthogonal d-q axis coordinate system by using a reference angle that rotates at an angular velocity identical with that of an output of said power converting apparatus, and outputs the d-axis component of said primary currents of said induction motor as said exciting current component;

oscillation component obtaining means for obtaining an oscillation component of the exciting current from said exciting current component;

correcting quantity obtaining means for obtaining a correcting quantity from said oscillation component of the exciting current, wherein said correcting quantity obtaining means obtains from said oscillation component of the exciting currents an exciting voltage oscillation component $\Delta v$, and outputs said exciting voltage oscillation component $\Delta v$ as said correcting quantity; and command providing means for correcting at least one of said command values using said correcting quantity, and for providing said power converting apparatus with stator axis voltage command values obtained on the basis of said corrected command values, wherein said command providing means comprises voltage amplitude obtaining means for obtaining a voltage amplitude from a frequency command value, three-phase oscillating means for generating stator axis voltage command values from said voltage amplitude and said frequency command value, and correcting means for correcting said stator axis voltage command values by said voltage correcting quantity $\Delta v$.

6. A control circuit for controlling a power converting apparatus as claimed in claim 5, wherein said correcting means comprises function generating means for generating three-phase signals in phase with said stator axis voltage command values, and corrects each of said stator voltage axis voltage command Values by a product obtained by multiplying said exciting voltage oscillation component Δv by each of said three-phase signals.

7. A control circuit for controlling a power converting apparatus in response to one or more command values, said control circuit comprising:

flux detecting means for detecting flux of each phase of said induction motor;

exciting current obtaining means for obtaining an exciting current component from a detected signal of each phase of primary currents of an induction motor, wherein said exciting current obtaining means comprises vector rotation means for resolving said primary currents of said induction motor into a d-axis component and a q-axis component on an orthogonal d-q axis coordinate system by using a reference angle that rotates at an angular velocity identical with that of an output of said power converting apparatus, and outputs the d-axis component of said primary currents of said induction motor as said exciting current component;

oscillation component obtaining means for obtaining an oscillation component of the exciting current from said exciting current component;

correcting quantity obtaining means for obtaining a correcting quantity from said oscillation component of the exciting current, wherein said correcting quantity obtaining means obtains from said oscillation component of the exciting current a flux oscillation component Δϕ, and outputs said flux oscillation component Δϕ as said correcting quantity; and command providing means for correcting at least one of said command values using said correcting quantity, and for providing said power converting apparatus with stator axis voltage command values obtained on the basis of said corrected command values, wherein said command providing means comprises flux amplitude obtaining means for obtaining a flux amplitude from a frequency command value, three-phase oscillating means for generating stator axis flux command values from said flux amplitude and said frequency command value, correcting means for correcting said stator axis flux command values by said flux correcting quantity Δϕ, means for computing a difference between each of said stator axis flux command values and each detected flux by said flux detecting means, and adjusting means for changing said difference to each one of said stator axis voltage command values.

8. A control circuit for controlling a power converting apparatus in response to one or more command values, said control circuit comprising:

exciting current obtaining means for obtaining an exciting current component from a detected signal of each phase of primary currents of an induction motor, wherein said exciting current obtaining means comprises for detecting an absolute value of said primary currents of said induction motor from said primary currents, means for detecting a phase angle of said primary currents with regard to a stator orthogonal coordinate system from said primary currents of said induction motor, means for detecting a phase angle of terminal voltages of said induction motor with regard to said stator orthogonal coordinate system from said terminal voltages, and means for computing said exciting current component on the basis of said absolute value of said primary currents, said phase angle of said primary currents and said phase angle of said terminal voltages;

oscillation component obtaining means for obtaining an oscillation component of the exciting current from said exciting current component;

correcting quantity obtaining means for obtaining a correcting quantity from said oscillation component of the exciting current, wherein said correcting quantity obtaining means obtains from said oscillation component of the exciting current an exciting voltage oscillation component Δv, and outputs said exciting voltage oscillation component Δv as said correcting quantity; and command providing means for correcting at least one of said command values using said correcting quantity, and for providing said power converting apparatus with stator voltage command values obtained on the basis of said corrected command values, wherein said command providing means comprises voltage amplitude obtaining means for obtaining a voltage amplitude from a frequency command value, three-phase oscillating means for generating stator axis voltage command values from said voltage amplitude and said frequency command value, and correcting means for correcting said stator axis voltage command values by said voltage correcting quantity Δv.

9. A control circuit for controlling a power converting apparatus in response to one or more command values, said control circuit comprising:

exciting current obtaining means for obtaining an exciting current component from a detected signal of each phase of primary currents of an induction motor, wherein said exciting current obtaining means comprises means for detecting an absolute value of said primary currents of said induction motor from said primary currents, means for detecting a phase angle of said primary currents with regard to a stator orthogonal coordinate system from said primary currents of said induction motor, means for detecting a phase angle of said stator voltage command values with regard to said stator orthogonal coordinate system from said stator voltage command values, and means for computing said exciting current component on the basis of said absolute value of said primary currents, said phase angle of said primary currents and said phase angle of said voltage command values;

oscillation component obtaining means for obtaining an oscillation component of the exciting current from said exciting current component;

correcting quantity obtaining means for obtaining a correcting quantity from said oscillation component of the exciting current, wherein said correcting quantity obtaining means obtains from said oscillation component of the exciting current an exciting voltage oscillation component Δv, and outputs said exciting voltage oscillation component Δv as said correcting quantity; and command providing means for correcting at least one of said command values using said correcting quantity, and for providing said power converting apparatus with stator axis voltage command values obtained on the basis of said corrected command values, wherein said command providing means comprises voltage amplitude obtaining means for obtaining a voltage amplitude from a frequency command value, three-phase oscillating means for generating stator axis voltage command values from said voltage amplitude and said frequency command value, and correcting means for correcting said stator axis voltage command values by said voltage correcting quantity Δv.

10. A control circuit for controlling a power converting apparatus in response to one or more command values, said control circuit comprising:

flux detecting means for detecting flux of each phase of said induction motor;

exciting current obtaining means for obtaining an exciting current component from a detected signal of each phase of primary currents of an induction motor, wherein said exciting current obtaining means comprises means for detecting an absolute value of said primary currents of said induction motor from said primary currents, means for detecting a phase angle of said primary currents with regard to a stator orthogonal coordinate system from said primary currents of said induction motor, means for detecting a phase angle of terminal voltages of said induction motor with regard to said stator orthogonal coordinate system from said terminal voltages, and means for computing said exciting current component on the basis of said absolute value of said primary currents, said phase angle of said primary currents and said phase angle of said terminal voltages;

oscillation component obtaining means for obtaining an oscillation component of the exciting current from said exciting current component;

correcting quantity obtaining means for obtaining a correcting quantity from said oscillation component of the exciting current, wherein said correcting quantity obtaining means obtains from said oscillation component of the exciting current a flux oscillation component $\Delta\phi$, and outputs said flux oscillation component $\Delta\phi$ as said correcting quantity; and command providing means for correcting at least one of said command values using said correcting quantity, and for providing said power converting apparatus with stator axis voltage command values obtained on the basis of said corrected command values, wherein said command providing means comprises flux amplitude obtaining means for obtaining a flux amplitude from a frequency command value, three-phase oscillating means for generating stator axis flux command values from said flux amplitude and said frequency command value, correcting means for correcting said stator axis flux command values by said flux correcting quantity $\Delta\phi$, means for computing a difference between each of said stator axis flux command values and each detected flux by said flux detecting means, and adjusting means for changing said difference to each one of said stator axis voltage command value.

11. A control circuit for controlling a power converting apparatus in response to one or more command values, said control circuit comprising:

flux detecting means for detecting flux of each phase of said induction motor;

exciting current obtaining means for obtaining an exciting current component from a detected signal of each phase of primary currents of an induction motor;

oscillation component obtaining means for obtaining an oscillation component of the exciting current from said exciting current component;

correcting quantity obtaining means for obtaining a correcting quantity from said oscillation component of the exciting current, wherein said correcting quantity obtaining means obtains from said oscillation component of the exciting current a flux oscillation component $\Delta\phi$, and outputs said flux oscillation component $\Delta\phi$ as said correcting quantity; and command providing means for correcting at least one of said command values using said correcting quantity, and for providing said power converting apparatus with stator axis voltage command values obtained on the basis of said corrected command values, wherein said command providing means comprises flux amplitude obtaining means for obtaining a flux amplitude from a frequency command value, three-phase oscillating means for generating stator axis flux command values from said flux amplitude and said frequency command value, correcting means for correcting said stator axis flux command values by said flux correcting quantity $\Delta\phi$, means for computing a difference between each of said stator axis flux command values and each detected flux by said flux detecting means, and adjusting means for changing said difference to each one of said stator axis voltage command value;

wherein said exciting current obtaining means comprises means for detecting an absolute value of said primary currents of said induction motor from said primary currents, means for detecting a phase angle of said primary currents of said induction motor with regard to a stator orthogonal coordinate system from said primary currents, means for detecting a phase angle of said stator axis voltage values outputted from said adjusting means with regard to said stator orthogonal coordinate system from said stator axis voltage values, and means for computing said exciting current component on the basis of said absolute value of said primary currents, said phase angle of said primary currents and said phase angle of said voltage command values.

* * * * *